Oct. 24, 1950     I. E. WIEGERS     2,527,504
ANTIHUNTING CONTROL DEVICE
Filed July 12, 1945     2 Sheets-Sheet 1

Irvin E. Wiegers
INVENTOR

Oct. 24, 1950 — I. E. WIEGERS — 2,527,504
ANTIHUNTING CONTROL DEVICE
Filed July 12, 1945 — 2 Sheets-Sheet 2

Irvin E. Wiegers
INVENTOR.

Patented Oct. 24, 1950

2,527,504

UNITED STATES PATENT OFFICE 2,527,504

ANTIHUNTING CONTROL DEVICE

Irvin E. Wiegers, Overland, Mo.

Application July 12, 1945, Serial No. 604,695

4 Claims. (Cl. 236—1)

This invention relates to a limiting device in which the setting of the device is automatically varied by cycling, hunting, or overshooting in the space in which control is desired. It is the object of this invention to provide a device which reduces the output of the change producing means when hunting or cycling in the space to be controlled is caused by the excessive output of the change producing means.

With the above and other objects in view which will appear as the description proceeds, this invention resides in the novel construction, combination and arrangement of parts as hereinafter described and more particularly defined by the appended claims, it being understood that such changes in the precise embodiment of the invention may be made as come within the scope of the claims.

Figure 1:
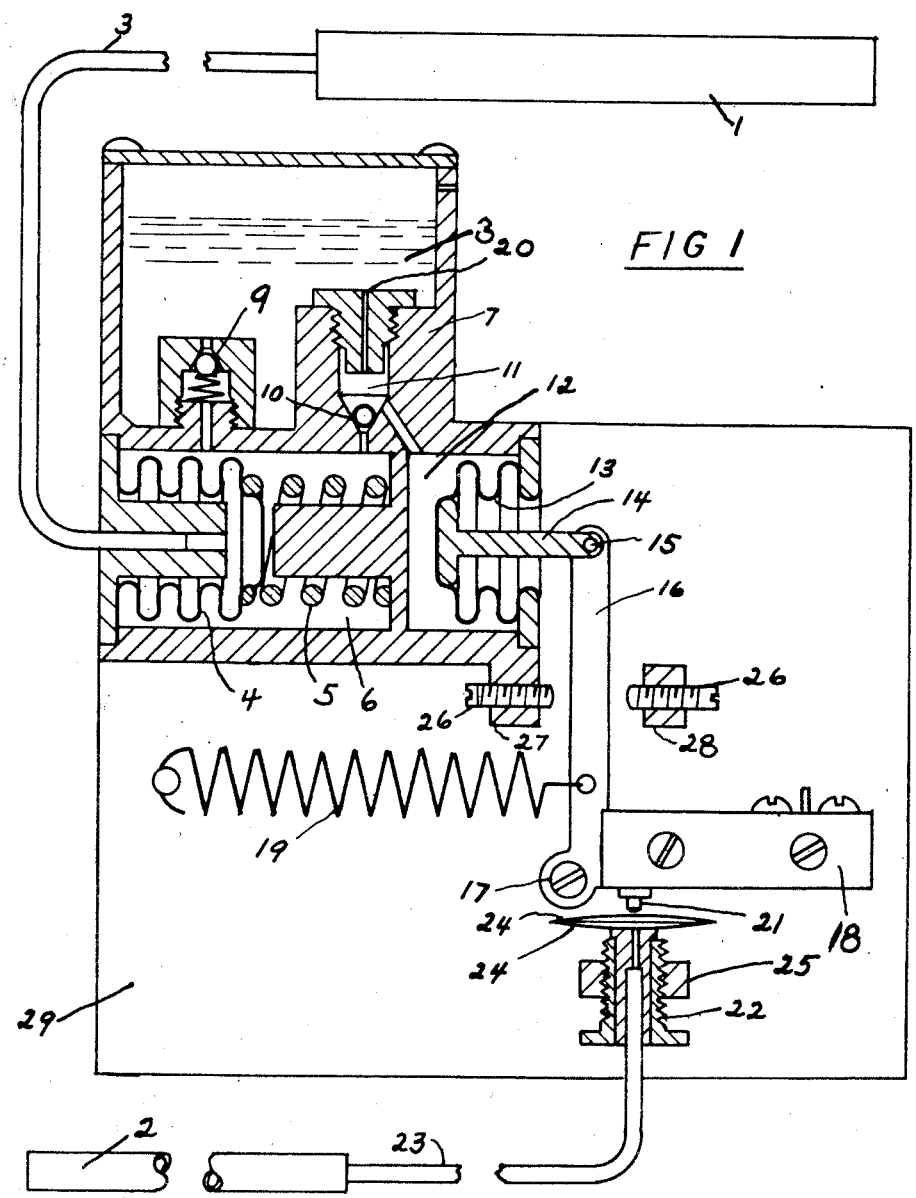
Figure 2:
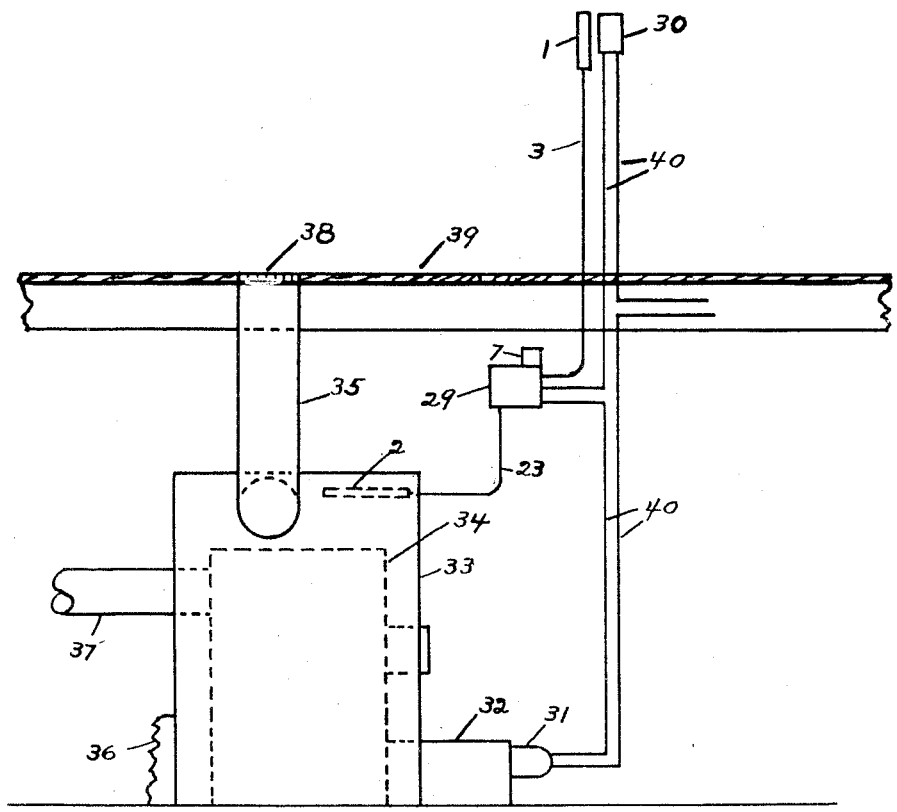

Fig. 1 in the accompanying drawing illustrates a physical embodiment of the invention as might be applied to a heating system. Fig. 2 illustrates the embodiment in Fig. 1 applied to an oil fired warm air heating system. The numeral 1 in Fig. 1 designates a temperature sensitive bulb which is placed in the space whose temperature is to be controlled, preferably near the room thermostat controlling the heating means. The temperature sensitive bulb 2 is subjected to the temperature of the heat producing means itself.

Bulb 1 is connected by means of tubing 3 with the interior of the sealed metallic bellows 4 and this system is charged with a suitable temperature sensitive fluid. This charge may be of the vapor pressure type or a gas or a liquid. A spring 5 abuts the bellows with a force which approximately counterbalances the force of the bellows but allows motion when the bulb 1 is in the range of temperature which it is desired to maintain.

In the event of a cycling temperature at the bulb 1 the bellows 4 will expand and contract in accordance with the rise and fall of the temperature. This action occurring in the chamber 6 in the casing 7 is used to pump a liquid from the reservoir 8 through the check valves 9 and 10 into the chamber 11 and the communicating chamber 12. The liquid thus forced into chamber 12 causes a deflection of the metallic bellows 13 when the amount is greater than the orifice 20 will bleed off. This motion is transmitted by plunger 14 and pin 15 to the arm 16 which is pivoted on shoulder screw 17 and carries the micro-switch 18. The spring 19 urges the arm 16 in a direction contrariwise to that caused by the liquid pumped into chamber 12. The bleed orifice 20 allows a constant leakage of liquid from the chambers 11 and 12 back into the reservoir 8.

The micro-switch 18 is of the type known as normally closed, that is its switch points will be in contact until the button 21 is depressed. The bulb 2, tubing 23 and diaphragms 24 form a sealed system which is filled with a liquid having desirable volumetric changes in response to temperature changes. The temperature of the bulb 2 at which the micro-switch 18 will open is dependent upon the position of the adjusting bushing 22 which engages the bracket 25 and the amount of temperature cycling at the bulb 1. A cycling temperature at bulb 1 moves the micro-switch 18 in a direction tending to lower the temperature at which the bulb 2 opens the switch. The permissible range of temperature setting variation caused by the temperature cycling at the bulb 1 previously described can be adjusted by means of the stop screws 26 engaging the brackets 27 and 28.

The mechanism is mounted on the plate 29.

An illustration of a practical application of this device might be its use on a warm air heating furnace which is fired by an oil burner as shown in Fig. 2. In this case the bulb 2 would be installed in the bonnet of the furnace 33 and the bulb 1 would be mounted near the room thermostat 30 in the living quarters to be heated and the room thermostat 30 would be wired in series with the micro-switch 18 and the oil burner motor 31. Assuming the room thermostat to be set at 70 degrees and a fairly even temperature maintained in the vicinity of the room thermostat and the bulb 1, the limit switch may never operate at all and the oil burner would be stopped and started by the room thermostat only, providing the bonnet temperature never exceeded the setting of the limit switch. If, however, the nature of the installation is such that the output of the furnace causes a marked rise above the setting of the room thermostat and the room temperature must again fall to the temperature setting on the room thermostat before the oil burner again operates, in other words, if there is temperature hunting or cycling in the vicinity of the bulb 1, the pumping action previously described will take place and its effect will be to lower the setting of the limit switch, thus causing the oil burner to cease operation sooner than it would with only the room thermostat in control.

Items also illustrated in Fig. 2 are the floor line of the living quarters 39, warm air register 38, warm air pipe 35, radiator 34, flue gas pipe 27, cool air intake 36, oil burner 32, and electrical wiring 40.

Since every system is more or less a law unto itself so far as hunting or cycling is concerned, the advantages of a switch in the system which is self-adjusting to minimize hunting is apparent.

The effect of the constant bleed orifice 20 is to allow the limit switch to set itself to the highest temperature possible which does not cause excessive hunting or cycling. The device will tend to set itself so that the amount of liquid pumped and the amount of bleeding off will equalize. The size of the orifice will thus affect the amount of hunting. The bleed enables the device to reset itself constantly in accordance to weather conditions.

Where an expandible liquid is used in the temperature sensitive bulb 1 it is possible to eliminate the use of the bellows 4 and spring 5. In this case the chambers 6, 11 and 12 should be reduced to the smallest possible volume. The bulb 1, tubing 3, chambers 6, 11, and 12, reservoir 8 and connecting passages would all be filled with the expandible liquid.

The pump illustrated in this invention is of a very simple type which takes in fluid upon a fall in temperature and discharges is upon a rise in temperature. Persons having knowledge of the positive displacement pumping art will immediately recognize that it is possible to construct what is known as a double stroke pump which will discharge on both a falling temperature and a rising temeperature or to make one which will discharge upon a falling temperature only. It is believed that the arrangement shown is a practical one for most applications of this invention but there may be cases in which another type of pumping action is preferable, or that means other than hydraulic be used.

Since the problem of hunting occurs in fields other than temperature and pressure control, for instance, in the governing of speed and electrical effects, and the invention may be applied to these uses, it is not limited to the embodiment shown and described, but by the scope of the claims.

Referring again to the embodiment illustrated in Figure 1, a detailed step by step description of the operation is as follows:

When the temperature at the bulb 1 falls, the bellows 4 reduces the volume of fluid it displaces. Consequently more fluid will be drawn through the check valve 9 into the chamber 6. The check valve 10 remains closed during this operation. When the temperature at the bulb 1 increases the bellows 4 displaces a greater volume and fluid from the chamber 6 is forced through the check valve 10 into the chambers 11 and 12. Repeated cycling of the temperature at bulb 1 will cause repeated pumping cycles. If the amount of fluid thus pumped is greater than the orifice 20 will bleed off, the bellows 13 is compressed and the relationship between the microswitch actuating button 21 and the diaphragms 24 is changed so that the contacts of the microswitch 18 are opened at a lower temperature in the vicinity of the bulb 2 or, if already previously opened, they will be held open until the temperature at the bulb 2 drops to a lower point. If the temperature cycling at the bulb 1 is of sufficient magnitude and frequency the bellows 13 will be collapsed sufficiently to bring the arm 16 in contact with the stop 26 in the bracket 28. In the absence of temperature changes at the bulb 1, the bellows 13 under the influence of the spring 19 will expand causing the fluid in the chamber 12 to bleed off through the orifice 20 until the arm 16 contacts the stop 26 in the bracket 27.

Referring again to Figure 2 which shows an application of this invention to a warm air domestic heating furnace, the advantages of this device become apparent when it is realized that such furnaces must be installed with a capacity sufficient to take care of comfort heating requirements in the most severe weather encountered in the vicinity of the installation. Consequently all such furnaces have a heating capacity greatly in excess of that required in normal winter weather. It is commonly known that these installations when put into operation produce a blast of heat which commonly drives the temperature far above the setting of the room thermostat. The furnace is then held out of operation by the room thermostat for a long period of time causing a feeling of discomfort and a marked drop in temperature. Such cycles continue unchecked in the conventional automatic heating installations. With the application of this invention to such an installation, the occurrence of such cycles will cause the temperature in the bonnet furnace to be held to limited values as previously explained. This prevents the over-shooting caused by the excessive capacity of the furnace and increases the efficiency of the furnace because better heat transfer conditions are maintained and greater comfort is produced in the quarters heated by the furnace.

This embodiment of the invention has been chosen because many persons are familiar with the objectionable temperature cycling caused by the conventional controls on domestic heating devices but persons skilled in the art will recognize other possibilities such as a cam actuated by the arm 16 used to limit the stroke of an automatic temperature control valve, thus preventing the hunting and cycling that often occurs in such devices.

What I claim is:

1. A device of the character described comprising means responsive to a phenomenon, means movable by the response to cyclic variations of the phenomenon and returning in the absence of such variations, and control means under control of the second named means to suppress the output of the phenomenon when such cyclic variations are produced.

2. A device of the character described comprising means controlling the rate of generation of a phenomenon, means responsive to said phenomenon, means moved in one direction by said responsive means in response to cyclic variations of the phenomenon and returning in the absence of such variations, and a control means acting on said first named means so that the rate of generation of the phenomenon is changed by the occurrence of cyclic variations of the phenomenon.

3. A device of the character described comprising a casing having three liquid containing compartments one of which constitutes a fluid reservoir and the others each having a movable wall, means responsive to a condition to move one of said movable walls, means actuated by the movable wall of the other compartment to control the operation of a condition changing means, two passages leading from the compartment having the condition responsive wall to the reservoir compartment, check valves in said passages and operable in opposite directions, a restriction in one of said passages and disposed on the reservoir side of the corresponding check valve, and a third passage leading from a point between the restriction and the corresponding check valve to the compartment having the condition changing means control wall.

4. A device of the character described comprising a casing having three liquid containing compartments, one of which constitutes a fluid reservoir and the others each having a movable wall, means responsive to temperature to move one of said movable walls, means actuated by the movable wall of the other compartment to control the operation of a heater, two passages leading from the compartment having the temperature responsive wall to the reservoir compartment, check valves in said passages and operable in opposite directions, a restriction in one of said passages and disposed on the reservoir side of the corresponding check valve, and a third passage leading from a point between the restriction and the corresponding check valve to the compartment having the heater control wall.

IRVIN E. WIEGERS.

REFERENCES CITED

The following references are of record in the file of this patent:

UNITED STATES PATENTS

| Number | Name | Date |
| --- | --- | --- |
| 1,919,129 | Reichel | July 18, 1933 |
| 2,181,427 | Grant | Nov. 28, 1939 |
| 2,187,061 | Smith | Jan. 16, 1940 |
| 2,208,559 | Baak | July 23, 1940 |
| 2,213,505 | Raney | Sept. 3, 1940 |
| 2,335,761 | Hultman | Nov. 30, 1943 |